(12) United States Patent
Campbell

(10) Patent No.: US 6,738,057 B1
(45) Date of Patent: May 18, 2004

(54) COMPENSATION FOR OPTICAL DISTORTION AT IMAGING PLANE

(75) Inventor: Scott P. Campbell, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/354,930

(22) Filed: Jul. 15, 1999

Related U.S. Application Data
(60) Provisional application No. 60/113,419, filed on Dec. 22, 1998.

(51) Int. Cl.[7] ................................................. H04N 5/335
(52) U.S. Cl. ....................................................... 345/315
(58) Field of Search ................................. 348/294, 300, 348/301, 302, 303, 308, 311, 315, 335, 340, 342; 250/208.1

(56) References Cited

U.S. PATENT DOCUMENTS

| 4,554,585 | A | * | 11/1985 | Carlson | 348/342 |
| 5,276,519 | A | * | 1/1994 | Richards et al. | 348/241 |
| 5,471,515 | A |   | 11/1995 | Fossum et al. | |
| 5,489,940 | A | * | 2/1996 | Richardson et al. | 348/315 |
| 6,201,574 | B1 | * | 3/2001 | Martin | 348/315 |

OTHER PUBLICATIONS

Shannon, Robert R., *The Art and Science of Optical Design*, Cambridge University Press, 1997, pp. 13–21, 191–192, 214–217, 235–248, 249, 334–336, 348–349 and 388–389.
Smith, Warren J. and Genesee Optics Software, Inc., *Modern Lens Design: A Resource Manual*, McGraw–Hill, Inc. 1992, pp. 25–27, 39, 54–57, 87–88, 148, 161, 411, 447–451.
Smith, Warren J.: *Modern Optical Engineering: The Design of Optical Systems*, 2d Edition, McGraw–Hill, Inc. 1990, pp. 67–68, 72, 74, 304, 307, 312 and 315.

* cited by examiner

*Primary Examiner*—Tuan Ho
(74) *Attorney, Agent, or Firm*—Dickstein Shapiro Morin & Oshinsky LLP

(57) ABSTRACT

An imaging system having an imaging optics and a semiconductor sensor array which has a spatial distribution of sensing pixels to substantially match a distortion profile produced by the imaging optics.

27 Claims, 2 Drawing Sheets

COMPENSATION FOR OPTICAL DISTORTION AT IMAGING PLANE

COMPENSATION FOR OPTICAL DISTORTION AT IMAGING PLANE

This application claims the benefit of U.S. Provisional Application No. 60/113,419, filed on Dec. 22, 1998.

BACKGROUND

The present application generally relates to optical imaging, and more particularly, to compensation for optical distortion in optical systems.

An optical imaging system having a defined optic axis can produce a geometrically-distorted image of an extended object with parts located away from the optic axis. Such distortion is in part caused by deviation of object points from the paraxial conditions. The amount of the distortion increases with the distance of an image point from the optic axis. One way to understand such distortion is that the magnification of the optical system varies across the imaging field. Other defects and imperfections in the optical components such as imaging lenses of the optical system also contribute to the total distortion of the image.

Two examples of some commonly-encountered geometrical distortions include pincushion distortion and barrel distortion as illustrated in FIG. 1. When magnification increases with the image point distance from the optic axis, the pincushion distortion occurs in which the image of a square has concave sides. In the opposite, when the magnification decreases with the image point distance from the optic axis, the barrel distortion occurs in which the image of a square has convex sides.

The distortion of an optical system can be reduced or compensated optically in the optical path of the system by controlling the physical attributes of one or more optical elements such as indices of refraction and physical dimensions of lenses in the system. One method uses composite lenses to achieve certain distortion correction. One limitation of such an approach is the complexity of the optical design. Manufacturing of such composite lens system often requires sophisticated fabrication and can be expensive. Hence, it may not be suitable for many mass-produced optical systems used in various applications such as digital cameras and camcorders.

Another limitation of the optical approach is that an optical design for compensating one type of geometric distortion may worsen one or more different aberrations. For example, a composite lens system designed for correcting either pincushion or barrel distortion may increase spherical aberration, chromatic aberration, coma, astigmatism, or Petzval curvature.

Therefore, it is desirable to find a different approach to correct geometrical distortions of an optical system.

SUMMARY

In recognition of the above and other limitations of optical correction of distortions, the present disclosure provides a non-optical technique to correct the total distortion caused by the imaging optics at the image plane. This is accomplished by using a specially designed sensor array at the image plane to detect the distorted image and to reconstruct an image of the object with a substantially reduced distortion by using pixel signals.

An imaging device according to one embodiment includes imaging optics to receive radiation from an object and to project an image of the object to an image plane, and a semiconductor sensor array located adjacent or at the image plane to receive the image. The imaging optics produces a distortion having a distortion profile at least in a portion of said image. The sensor array has a plurality of sensing pixels arranged relative to one another to substantially reduce the distortion profile produced by the imaging optics so as to produce pixel signals indicative of the object with a reduced distortion.

The sensing pixels may be arranged in columns and rows and at least a portion of the columns and rows are curved in a manner determined by the distortion profile. In one implementation, each sensing pixel has a photosensitive area whose size depends on its position in the sensor array according to the distortion profile to correct a distortion in an intensity distribution associated with the distortion of the imaging optics. In another implementation, the sensing pixels each have photosensitive areas that are substantially identical to one another. Accordingly, a processing circuit is provided to modify the pixel signals to correct the distortion in the intensity distribution.

Further, an intensity distortion caused by the vignetting effect of the imaging optics and the sensor array may also be compensated for by changing the size of each photosensitive area or modifying output signal of each pixel according to its position in the sensor array.

A method for correcting optical distortion in an imaging system is also disclosed. First, a distortion profile of an imaging optics at a plane is determined. Then, a sensor array of sensing pixels is formed by arranging the sensing pixels in curved rows and columns based on the distortion profile. Next, the sensor array is placed adjacent or at the plane to convert an image produced by the imaging optics into pixel signals that represent an electronic version of the image with a reduced amount of distortion.

These and other aspects and associated advantages will become more apparent in light of the detailed description, the accompanying drawings, and the appended claims.

DETAILED DESCRIPTION

The non-optical compensation for the geometrical distortion in optical images is implemented by using a special sensor array at the imaging plane of the imaging optics. The spatial shape of the sensor array is designed so that the pixels substantially match the distortion profile produced by the imaging optics at the imaging plane. The pixel output signals, therefore, can be used to construct an image of the object that is essentially free of the geometrical distortion.

Figure 1:
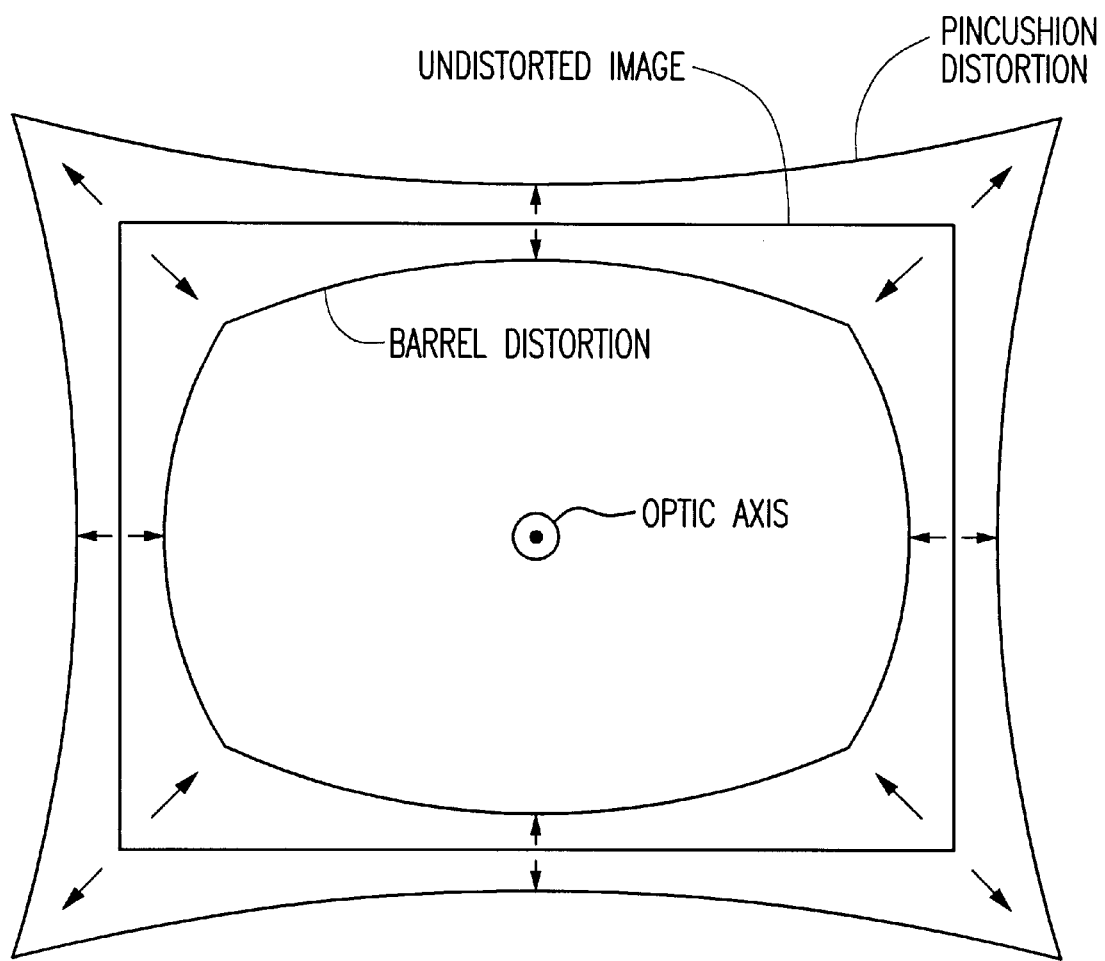
FIG. 1 illustrates pincushion and barrel distortions as examples of geometrical distortions in the image produced by an optical system.
Figure 2:
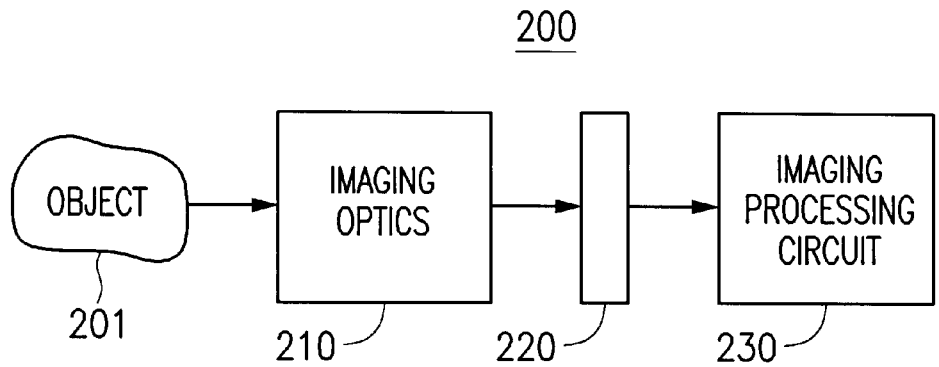
FIG. 2 shows one embodiment of an imaging system having a special sensor array for correcting the geometrical distortion produced by the imaging optics, where solid lines with arrows represent optical signals and dashed lines with arrows represent electrical signals.

FIG. 2 shows one embodiment 200 of an imaging system that has the special sensor array 220. The system 200 includes imaging optics 210, the sensor array 220, and an image processing circuit 230. The imaging optics 210 may include one or more lenses or lens arrays that project an optical image of an object 201 onto the sensor array 220. The sensor array 220 has sensing pixels formed on a semiconductor substrate. Each pixel has a photosensitive area, e.g., a photogate or photodiode, to convert received photons into a pixel signal and a non-photosensitive area which has pixel circuit elements to process the pixel signal. The pixel signals from the sensing pixels constitute an electronic image of the received optical image. The imaging processing circuit 230 is coupled to the sensing pixels to read out the pixel signals into another circuit for further processing, a display device to display the electronic image, or a memory device to buffer the electronic image. Certain signal processing capabilities may also be incorporated in the circuit 230. Further, the circuit 230 may be integrated with the sensor array on the same substrate.

The sensor array 220 may be configured as an active pixel sensor to include an active transistor that amplifies the respective pixel signal. One embodiment of such active sensor arrays has CMOS pixels to directly convert photo-induced charge into an electrical signal. Each pixel may also include an in-pixel buffer circuit to buffer the pixel signal and an in-pixel select transistor to output the buffered pixel signal in response to a received control signal. Another advantage of this CMOS sensor is the integration of the processing circuit 230 on the same substrate with the sensor array. See, for example, U.S. Pat. No. 5,471,515 to Fossum et al.

Pixels of the sensor array 220 are arranged relative to one another in a spatial pattern to substantially match the distortion profile of the imaging optics 210 projected upon the sensor array 220. Hence, unlike many conventional sensor arrays where the pixels are uniformly arranged in straight columns and rows, columns and rows of pixels in the sensor array 220 are usually curved at least in certain portions of the array. The number of sensing pixels per unit area, i.e., the pixel density, varies with the position within the sensor array to produce a non-uniform spatial distribution of the sensing pixels. The distortion caused by the imaging optics 210 must be determined first in order to construct a proper "matching" sensor array 220.

The imaging optics 210 is functionally equivalent to a single lens although it may comprise one or more lenses to form a combination lens. The geometrical distortion produced by a given imaging optics may be measured or computed based on its parameters. The image position vector $P_i$ in the image plane for an object point in an object plane spaced from the imaging optics larger than the front focal length can be approximately given by an odd-order polynomial expansion:

$$P_i = (y + B_5 y^3 + C_{12} y^5) e_y + (z + B_5 z^3 + C_{12} z^5) e_z$$

where y and z are position coordinates of the object point in the object plane, $e_y$ and $e_z$ are the unity vectors for y and z directions (the optic axis is along the x direction), and coefficients $B_5$ and $C_{12}$ are determined by the design parameters of the imaging optics. Depending on the requirements of a specific application, higher-order terms (e.g., $y^7$, $y^9$, etc.) may be included to increase the accuracy of correction. The coefficients $B_5$ and $C_{12}$ may be calculated directly from known design parameters of the imaging optics, or may be determined from fitting the odd-order polynomial expansion to actual measurements of distortion of the imaging optics in the imaging plane. For example, a rectangular grid may be used as an object to form an image in the imaging plane and the actual distortion of its image can be measured.

After the distortion profile at the imaging plane of the imaging optics is known, the spatial pattern of the sensing pixels of the array 220 can be determined accordingly. The optical distortion produces a number of effects in the imaging plane. One effect is a geometrical distortion of the image. For example, a straight line in a grid object becomes a curved line in the imaging plane. Another effect is a redistribution of the light intensity associated with the geometrical distortion. For example, the light intensity in a "squeezed" region in the image becomes higher, or conversely the light intensity in a "expanded" region becomes lower than it would have been without the distortion. The non-optical compensation of the system 200 in FIG. 2 can be designed to compensate for both of these distortion effects.

Figure 3:
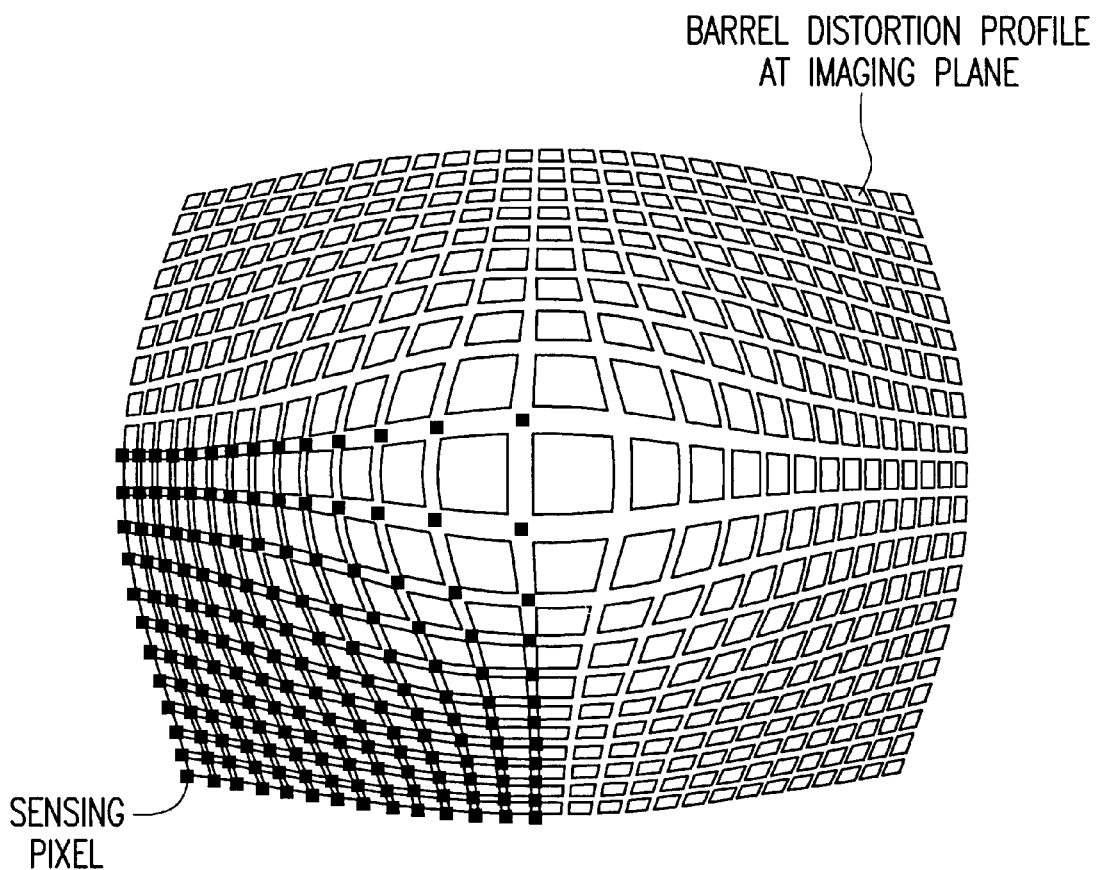
FIG. 3 shows an exemplary distortion profile of an imaging optics that produces a barrel distortion and the respective pixel arrangement of a sensor array that matches the distortion profile.

FIG. 3 shows an exemplary distortion profile of imaging optics that produces a barrel distortion and the respective spatial arrangement of a quarter of sensor array 220. The sensing pixels, represented by black squares, are arranged in curved columns and rows to follow the curved lines of the barrel distortion. This configuration of the sensor array 220 corrects the geometrical part of the barrel distortion.

When all sensing pixels are substantially identical to one another in their photosensitive areas as illustrated in FIG. 3, a sensing pixel in the central region receives fewer photons than a sensing pixel in a peripheral region. Both should have received the same amount of light, however, in the absence of the barrel distortion when the input image is a uniformly-illuminated field. The barrel distortion makes the light intensity in the peripheral regions higher than the light intensity in the central region.

To correct this intensity distortion, the image processing circuit 230 may be used to electronically modify the magnitudes of the pixel signals according to the distorted intensity pattern associated with the barrel distortion. In the above example, a pixel signal from a pixel in the central region of the image field should be amplified relative to a pixel signal of a pixel in a peripheral region. The circuit 230 multiplies each pixel signal with a normalization factor designated to that pixel position during readout. The normalization factor is a function of the pixel position. Such signal manipulation can be implemented by known electronic techniques, e.g., using a variable gain amplifier.

Alternatively, the sensing pixels in the array 220 for correcting the barrel distortion shown in FIG. 3 may be replaced with sensing pixels of different sizes so that the photosensitive areas can vary with their locations in the image field. For example, the photosensitive area of a pixel in the central region can be larger than that of a pixel near the boundary of the image field in order to correct the intensity distortion. This configuration simplifies the subsequent signal processing but complicates the fabrication of the sensor array.

Another effect, the vignetting effect caused by varying amount of received photons due to varying overlapping of the apertures of the imaging optics 210 and the sensor array 220 in the image, may also contribute to the intensity variation of the image received by the sensor array 220. The vignetting effect typically causes the peripheral regions of the image to receive less light than the central region of the image. Hence, in addition to the intensity redistribution by the optical distortion, the vignetting effect may also be included to compensate for the total intensity distortion by using the circuit 230 to do so electronically, or varying the size of the photosensing areas with their pixel locations, or a combination of both. The spatial intensity variation by the vignetting effect may be determined by either calculation or actual measurements. In the example of the barrel distortion, the vignetting effect may partially cancel the intensity distortion caused by the barrel distortion.

The above non-optical techniques of correcting distortion may be used to correct many distortions produced by a given imaging optics 210 without resorting to complex combination lens design and costly optical fabrication. In particular, using such distortion-matched sensor arrays can relax requirements on the imaging optics 210 for correcting distortion and hence allow the imaging optics 210 to be designed to improve other performance parameters such as resolution, chromaticism, the lens speed, and compensating for other optical aberrations. Hence, trade-offs in conventional optical correction of distortions can be relieved.

Furthermore, for a batch of imaging lenses that are produced through the same fabrication process, the optical distortions may be within the same range but different from one another. An averaged distortion profile of the lenses may be used to produce distortion-matched sensor arrays for correcting the distortions. Although the distortion in each lens may be not completed canceled by using such a sensor array, most of the distortion can be eliminated. For example, to compensate the distortions of two lenses that respectively have 10% and 14% barrel distortions, the distortion-matched sensor arrays can be designed to cancel a distortion of 12%. As the result, the first lens would have 2% pincushion distortion and the second lens would have 2% barrel distortion. This may be acceptable for certain applications. Moreover, this can significantly reduce the cost of mass-produced imaging systems.

Although only a few embodiments are described, various modifications and enhancements may be made without departing from the following claims.

What is claimed is:

1. An imaging device, comprising:
   imaging optics to receive radiation from an object and to project an image of the object to an image plane, wherein said imaging optics produces a distortion having a distortion profile at least in a portion of said image; and
   a semiconductor sensor array located adjacent or at said image plane to receive said image and having a plurality of sensing pixels arranged relative to one another to substantially reduce a spatial component of the distortion profile produced by said imaging optics, to produce pixel signals indicative of said image of the object with a reduced distortion;
   wherein each sensing pixel has a photosensitive area whose size depends on an intensity component of said distortion profile, to correct a distortion in an intensity distribution across said sensor array.

2. A device as in claim 1, wherein said spatial component of said distortion profile is curved and said sensing pixels are arranged in columns and rows and at least a portion of said columns and rows are curved in a manner determined by said spatial component of said distortion profile.

3. A device as in claim 1, wherein a number of sensing pixels per unit area of said sensor array changes with a position according to said spatial component of said distortion profile.

4. A device as in claim 1, wherein each sensing pixel includes an active transistor.

5. A device as in claim 1, wherein each sensing pixel includes a buffer circuit to buffer a pixel signal indicating a level of received light.

6. A device as in claim 1, wherein a size of said photosensitive area of each sensing pixel is further dependent on an intensity component of the distortion profile, and wherein said intensity component of said distortion profile is affected by a vignetting effect of said imaging optics and said sensor array.

7. An imaging device, comprising:
   imaging optics to receive radiation from an object and to project an image of the object to an image plane, wherein said imaging optics produces a distortion having a distortion profile at least in a portion of said image; and
   a semiconductor sensor array located adjacent or at said image plane to receive said image and having a plurality of sensing pixels arranged relative to one another to substantially reduce a spatial component of the distortion profile produced by said imaging optics, to produce pixel signals indicative of said image of the object with a reduced distortion;
   wherein said sensing pixels each have photosensitive areas that are substantially identical to one another, and further comprising a processing circuit operable to modify said pixel signals to correct an intensity component of the distortion profile.

8. A device as in claim 7, wherein said processing circuit is further configured to modify said pixel signals to compensate for a portion of the intensity component of the distortion profile caused by a vignetting effect of said imaging optics and said sensor array.

9. A method for correcting optical distortion in an imaging system, comprising:
   determining a distortion profile of imaging optics at a plane, said distortion profile having a spatial component and an intensity component;
   forming a sensor array of sensing pixels by arranging the sensing pixels in curved rows and columns based on the spatial component of the distortion profile; and
   placing the sensor array adjacent or at the plane to convert an image produced by the imaging optics into pixel signals that represent an electronic version of the image with a reduced amount of distortion;
   wherein said sensing pixels each have photosensitive areas that are substantially identical to one another, and further comprising modifying the pixel signals to correct for the intensity component of the distortion profile of said sensor array.

10. A method as in claim 9, wherein the modification to the pixel signals is related to at least one of a vignetting effect of the imaging optics and the sensor array.

11. A method as in claim 9, wherein a number of sensing pixels per unit area of the sensor array changes with a position according to the distortion profile.

12. A method as in claim 9, wherein each sensing pixel is an active pixel.

13. A method for correcting optical distortion in an imaging system, comprising:
   determining a distortion profile of imaging optics at a plane, said distortion profile having a spatial component and an intensity component;
   forming a sensor array of sensing pixels by arranging the sensing pixels in curved rows and columns based on the spatial component of the distortion profile;
   placing the sensor array adjacent or at the plane to convert an image produced by the imaging optics into pixel signals that represent an electronic version of the image with a reduced amount of distortion; and
   varying a size of a photosensitive area in each sensing pixel based on the intensity component of the distortion profile.

14. A method as in claim 13, wherein the size of each photosensitive area varies with at least a vignetting effect of the imaging optics and the sensor array.

15. An imaging device, comprising:

a substrate formed of a semiconductor material;

an array of sensing pixels formed on said substrate and arranged relative to one another to form a spatial pattern that substantially matches a spatial component of a distortion profile produced by an imaging optics at its imaging plane, wherein said array, when placed at said imaging plane, is operable to produce pixel signals indicative of an image projected by said imaging optics, wherein each sensing pixel has a photosensitive area whose size is based on an intensity component of the distortion profile to correct a distortion in an intensity distribution across said array; and a processing circuit coupled to said array to read out said pixel signals to construct said imaging with a reduced distortion.

16. A device as in claim 15, wherein said sensing pixels arc arranged in columns and rows and at least a portion of said columns and rows are curved in a manner determined by said distortion profile.

17. A device as in claim 15, wherein a number of sensing pixels per unit area of said array changes with said distortion profile.

18. A device as in claim 15, wherein said array is a CMOS active pixel sensor array and said processing circuit is integrated on said substrate.

19. A device as in claim 15, wherein the size of each photosensitive area further varies according to a vignetting effect of the imaging optics and the sensor array.

20. An imaging device, comprising:

a substrate formed of a semiconductor material;

an array of sensing pixels formed on said substrate and arranged relative to one another to form a spatial pattern that substantially matches a spatial component of a distortion profile produced by an imaging optics at its imaging plane, wherein said array, when placed at said imaging plane, is operable to produce pixel signals indicative of an image projected by said imaging optics; and a processing circuit coupled to said array to read out said pixel signals to construct said imaging with a reduced distortion;

wherein said sensing pixels each have photosensitive areas that are substantially identical to one another, and said processing circuit is configured to modify said pixel signals to correct for an intensity component of the distortion profile.

21. A device as in claim 20, wherein said processing circuit is further configured to modify the pixel signals to compensate for an intensity distortion caused by the vignetting effect of the imaging optics and the sensor array.

22. An imaging device, comprising:

imaging optics to receive radiation from an object and to project an image of the object to an image plane, wherein said imaging optics produces a distortion having a distortion profile at least in a portion of said image, wherein said distortion is a variance in intensity; and a semiconductor sensor array located adjacent or at said image plane to receive said image and having a plurality of sensing pixels for producing pixel signals; and a processing circuit for processing said pixel signals to produce a digital image;

wherein at least one of said sensor array and processing circuit is arranged to reduce said distortion profile in said digital image.

23. The imaging device of claim 22, wherein said sensor array is arranged such that some pixels of said array have a size of a photosensitive area different from a size of a photosensitive area of other pixels of said array.

24. The imaging device of claim 22, wherein said processing circuit varies a gain of said pixel signals produced by one pixel of said array relative to a gain of pixel signals produced by other pixels of said array.

25. The imaging device of claim 22, wherein said processing circuit includes an amplified gain correction circuit.

26. The imaging device of claim 22, the distortion profile includes a spatial component and the plurality of sensing pixels are arranged spatially relative to one another to substantially reduce the spatial component of the distortion profile produced by said imaging optics, to produce pixel signals indicative of said image with reduced distortion.

27. The imaging device of claim 22, wherein a size of a photosensitive area of each sensing pixel is varied relative to each other to substantially reduce the distortion profile, to produce pixel signals indicative of said image with reduced distortion.

\* \* \* \* \*